(12) United States Patent
Stoimenov et al.

(10) Patent No.: US 11,790,891 B2
(45) Date of Patent: Oct. 17, 2023

(54) WAKE WORD SELECTION ASSISTANCE ARCHITECTURES AND METHODS

(71) Applicant: Microsoft Technology Licensing, LLC, Redmond, WA (US)

(72) Inventors: Emilian Stoimenov, Bellevue, WA (US); Khuram Shahid, Seattle, WA (US); Guoli Ye, Sammamish, WA (US); Hosam Adel Khalil, Redmond, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/539,622

(22) Filed: Dec. 1, 2021

(65) Prior Publication Data

US 2022/0254334 A1  Aug. 11, 2022

Related U.S. Application Data

(63) Continuation of application No. 16/522,427, filed on Jul. 25, 2019, now Pat. No. 11,222,622.
(Continued)

(51) Int. Cl.
*G10L 15/07* (2013.01)
*G10L 15/02* (2006.01)
(Continued)

(52) U.S. Cl.
CPC .............. *G10L 15/07* (2013.01); *G10L 13/00* (2013.01); *G10L 13/033* (2013.01); *G10L 13/10* (2013.01);
(Continued)

(58) Field of Classification Search
CPC ......... G10L 15/00; G10L 15/02; G10L 15/07; G10L 15/22; G10L 15/187; G10L 13/00;
(Continued)

(56) References Cited

U.S. PATENT DOCUMENTS

| 9,275,637 B1* | 3/2016 | Salvador | ................. G10L 15/06 |
| 2014/0012586 A1* | 1/2014 | Rubin | ..................... G10L 15/08 |
| | | | 704/E21.001 |

(Continued)

OTHER PUBLICATIONS

U.S. Appl. No. 16/522,427 U.S. Pat. No. 11,222,622, filed Jul. 25, 2019, Wake Word Selection Assistance Architectures and Methods.
(Continued)

*Primary Examiner* — Daniel C Washburn
*Assistant Examiner* — Sean E Serraguard
(74) *Attorney, Agent, or Firm* — Schwegman Lundberg & Woessner, P.A.

(57) ABSTRACT

Generally discussed herein are devices, systems, and methods for custom wake word selection assistance. A method can include receiving, at a device, data indicating a custom wake word provided by a user, determining one or more characteristics of the custom wake word, determining that use of the custom wake word will cause more than a threshold rate of false detections based on the characteristics, rejecting the custom wake word as the wake word for accessing a personal assistant in response to determining that use of the custom wake word will cause more than a threshold rate of false detections, and setting the custom wake word as the wake word in response to determining that use of the custom wake word will not cause more than the threshold rate of false detections.

20 Claims, 5 Drawing Sheets

Related U.S. Application Data

(60) Provisional application No. 62/843,545, filed on May 5, 2019.

(51) Int. Cl.
| | | |
|---|---|---|
| *G10L 15/187* | (2013.01) | |
| *G10L 13/033* | (2013.01) | |
| *G10L 15/22* | (2006.01) | |
| *G10L 13/10* | (2013.01) | |
| *G10L 13/00* | (2006.01) | |
| *G10L 15/08* | (2006.01) | |

(52) U.S. Cl.
CPC ............ *G10L 15/02* (2013.01); *G10L 15/187* (2013.01); *G10L 15/22* (2013.01); *G10L 2015/025* (2013.01); *G10L 2015/088* (2013.01); *G10L 2015/223* (2013.01)

(58) Field of Classification Search
CPC . G10L 13/033; G10L 13/10; G10L 2015/025; G10L 2015/088; G10L 2015/223
See application file for complete search history.

(56) References Cited

U.S. PATENT DOCUMENTS

| | | | |
|---|---|---|---|
| 2014/0067391 A1* | 3/2014 | Ganapathiraju | G10L 15/01 704/E15.001 |
| 2015/0120287 A1* | 4/2015 | Stern | G10L 15/183 704/231 |
| 2015/0154953 A1* | 6/2015 | Bapat | G10L 15/06 704/251 |
| 2015/0243275 A1* | 8/2015 | Luan | G10L 13/033 704/260 |
| 2019/0027138 A1* | 1/2019 | Wang | G10L 15/22 |
| 2020/0184959 A1* | 6/2020 | Yasa | G10L 15/1815 |
| 2021/0065699 A1* | 3/2021 | Kaushik | G10L 15/187 |
| 2021/0407498 A1 | 12/2021 | Stoimenov et al. | |

OTHER PUBLICATIONS

Farley, et al., "Get started with Custom Keyword", Retrieved from: https://docs.microsoft.com/en-us/azure/cognitive-services/speech-service/custom-keyword-basics?pivots=programmirig-language-csharp, Nov. 3, 2020, 6 Pages.

"Notice of Allowance Issued in U.S. Appl. No. 17/474,829", dated Apr. 5, 2023, 7 Pages.

"Non Final Office Action Issued in U.S. Appl. No. 17/474,829", dated Jan. 13, 2023, 11 Pages.

* cited by examiner

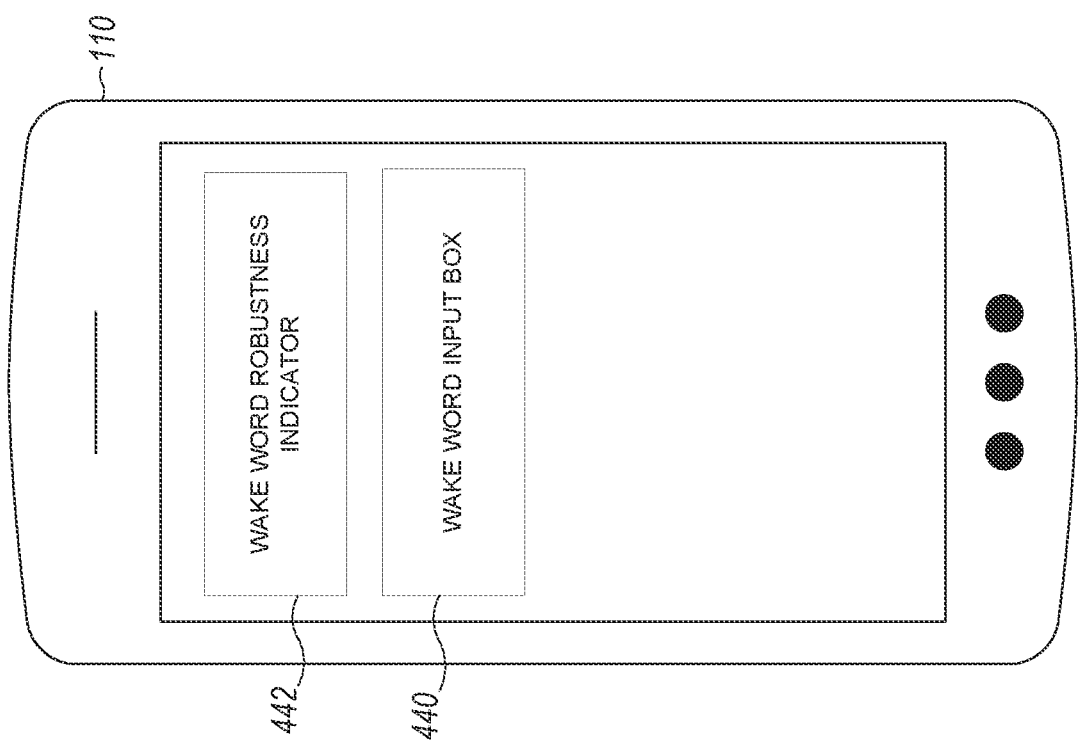

WAKE WORD SELECTION ASSISTANCE ARCHITECTURES AND METHODS

RELATED APPLICATION

This application is a continuation of U.S. patent application Ser. No. 16/522,427, filed on Jul. 25, 2019, and titled "Wake Word Selection Assistance Architectures and Methods", which claims the benefit of priority to U.S. Provisional Patent Application Ser. No. 62/843,545, filed on May 5, 2019, and titled "Wake Word Selection Assistance Architectures and Methods", each of which is incorporated herein by reference in its entirety.

BACKGROUND

The use of automatic personal assistants has grown significantly. A personal assistant is an application or service that retrieves information, executes a task, or initiates execution of a task on behalf of a user. Users can communicate with such personal digital assistants using a conversational interface, such as a microphone and speaker.

SUMMARY

The following presents a shortened summary of various aspects of this disclosure in order to provide a basic understanding of such aspects. This summary is not an extensive overview of all contemplated aspects and is intended to neither identify key or critical elements nor delineate the scope of such aspects. A purpose of this summary is to present some concepts of this disclosure in a compact form as a prelude to a more detailed description that is presented later.

In one aspect of the present disclosure, systems and methods are disclosed for assisting a user of a personal assistant or product developer in choosing a custom wake word. In one instance, a method for wake word selection assistance can include receiving, at a device, data indicating a custom wake word provided by a user, determining one or more characteristics of the custom wake word. The method can include determining whether the custom wake word will cause more than a threshold rate of false detections based on the characteristics. The method can include rejecting the custom wake word as the wake word (e.g., refraining from setting the wake word equal to the custom wake word, prompting the user for a different custom wake word, indicating that the custom wake word is not a good choice for a wake word, a combination thereof, or the like) in response to determining the provided word will cause more than a threshold rate of false detections, and allowing the user to use the word as the wake word in response to determining the provided word will not cause more than the threshold rate of false detections.

BRIEF DESCRIPTION OF DRAWINGS

FIG. 4 illustrates, by way of example, a diagram of an embodiment of the device.

DETAILED DESCRIPTION

Figure 1:
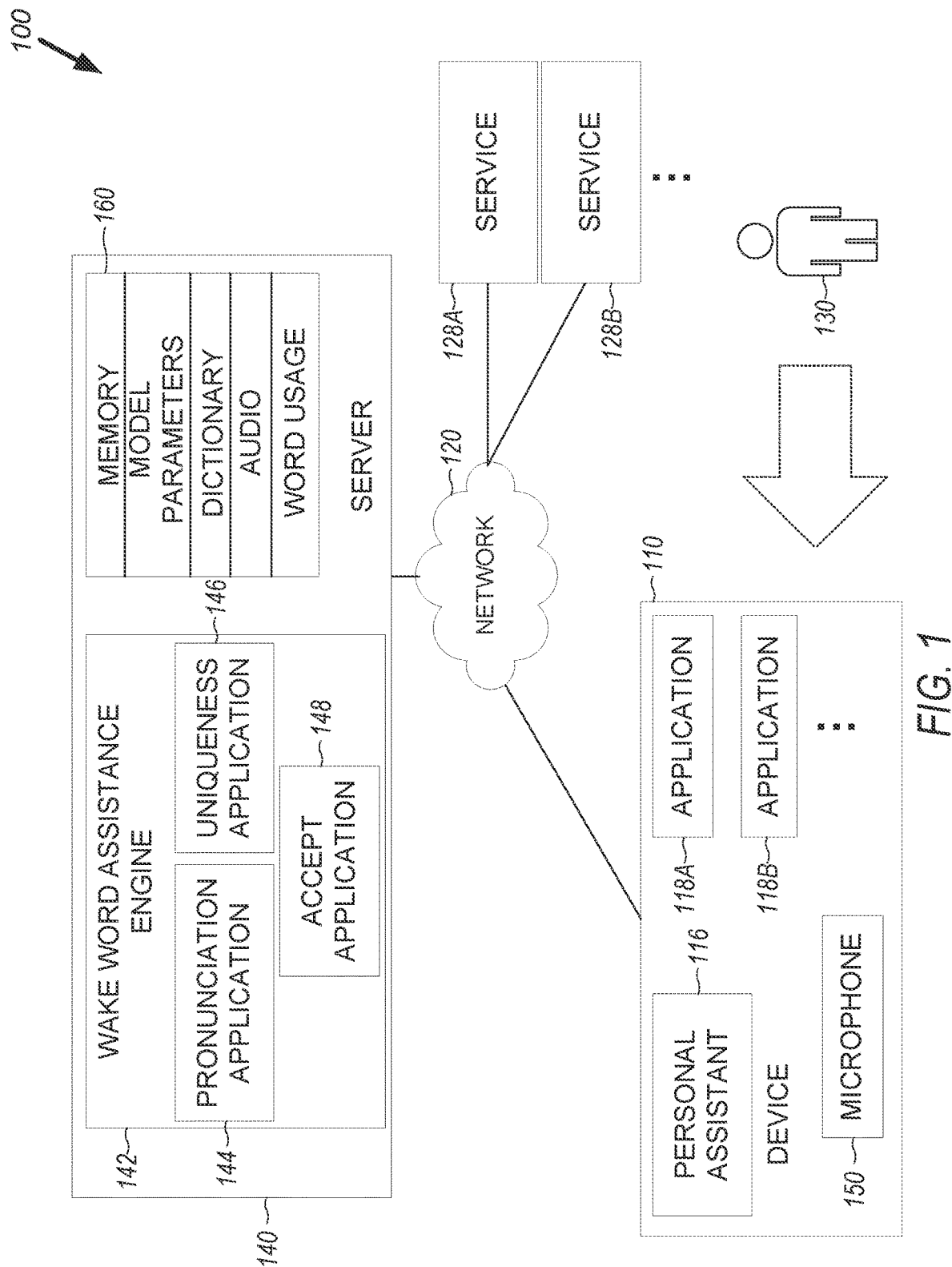
FIG. 1 illustrates, by way of example, a diagram of an embodiment of a system.

Aspects and implementations of the present disclosure are directed to guiding a user in selection of a robust wake word. Robust, in this context, means there is a sufficiently low likelihood that another word is confused for a chosen wake word (sufficiently low false detection).

A reference number without a suffix refers to an item generally and a reference number with a suffix refers to the corresponding item specifically. For example, application 118 refers to application 118A, 118B, or both of the applications 118A and 118B.

Intelligent personal assistants and related technologies can enable a user to obtain information, execute tasks, and perform other activities. Users can interact with or control such personal assistants via conversational interfaces such as messaging, chat, audio commands, or the like. To access a personal assistant, a wake word is typically used. A wake word is a word or phrase that indicates, to the personal assistant, that the user is asking the personal assistant to perform a task. Wake words are typically pre-programmed into a personal assistant. For example, Microsoft® Corporation of Redmond, Wash., United States, has a personal assistant that can be accessed using the phrase "Hey Cortana". However, some people may not like the phrase, may use the word "Cortana" in reference to something other than the personal assistant, or may otherwise want to choose their own wake word for accessing the personal assistant.

However, not all words or phrases make good wake words. For example, a word that is similar, phonetically or in sound, to another word may not be a good wake word. This is because the similar word may get confused for the wake word, unnecessarily waking up the personal assistant, or confuse the personal assistant as to what the user is asking of the personal assistant. In another example, a word is a subset of another word. Consider the words "book" and "bookkeeper". The word "book" needs to be pronounced to say the word "bookkeeper". Thus, "book" is not a good wake word, as it is a subset of other words that would trigger the personal assistant to act when uttered.

Accordingly, described herein are various implementations of technologies, including methods, machine-readable mediums, and systems, that enable assistance or guidance to a user or product developer in selecting a wake word. For example, the described technologies can aid a user in selecting a robust wake word. Generally, the custom wake word can be selected by the user or a product developer, even though the description describes the selection as being from the user.

It can therefore be appreciated that the described technologies are directed to and address specific technical challenges and longstanding deficiencies in multiple technical areas, including but not limited to communication interfaces, semantic relationships, and personal assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates, by way of example, a diagram of an embodiment of a system 100. As shown, the system 100 includes device 110 which can be a laptop computer, a desktop computer, a terminal, a mobile phone, a tablet computer, a smart watch, a digital music player, a server, and the like. User 130 can be a human user who interacts with device 110. For example, user 130 can provide various inputs (e.g., via an input device/interface such as a keyboard, mouse, touchscreen, microphone, etc.) to device 110. Device 110 can also display, project, and/or otherwise provide content to user 130 (e.g., via output components such as a screen, speaker, etc.).

As shown in FIG. 1, device 110 can include personal assistant 116. Personal assistant 116 can be an application or module that configures/enables the device 110 to interact with, provide content to, and/or otherwise perform operations on behalf of user 130. For example, personal assistant 116 can receive communications and/or request(s) from user 130 and present/provide responses to such request(s) (e.g., within a conversational or 'chat' interface). In certain implementations, personal assistant 116 can also identify content that can be relevant to user 130 (e.g., based on a location of the user or other such context) and present such content to the user. Personal assistant 116 can also enable user 130 to initiate and/or configure other application(s) (e.g., application 118A, 118B as described below). For example, personal assistant 116 can initiate an application (e.g., a media player application) that fulfills a request provided by the user. Personal assistant 116 can also initiate and/or perform various other operations, such as are described herein.

It should be noted that while various components (e.g., personal assistant 116) are depicted and/or described as operating on a device 110, this is only for the sake of clarity. However, in other implementations the referenced components can also be implemented on other devices/machines. For example, in lieu of executing locally at device 110, aspects of personal assistant 116 can be implemented remotely (e.g., on a server 140 or within a cloud service 128 or framework). By way of illustration, personal assistant 116 can be configured to execute on a remote device (e.g., server 140, as described below) and provide communications, information, etc., to device 110.

Figure 6:
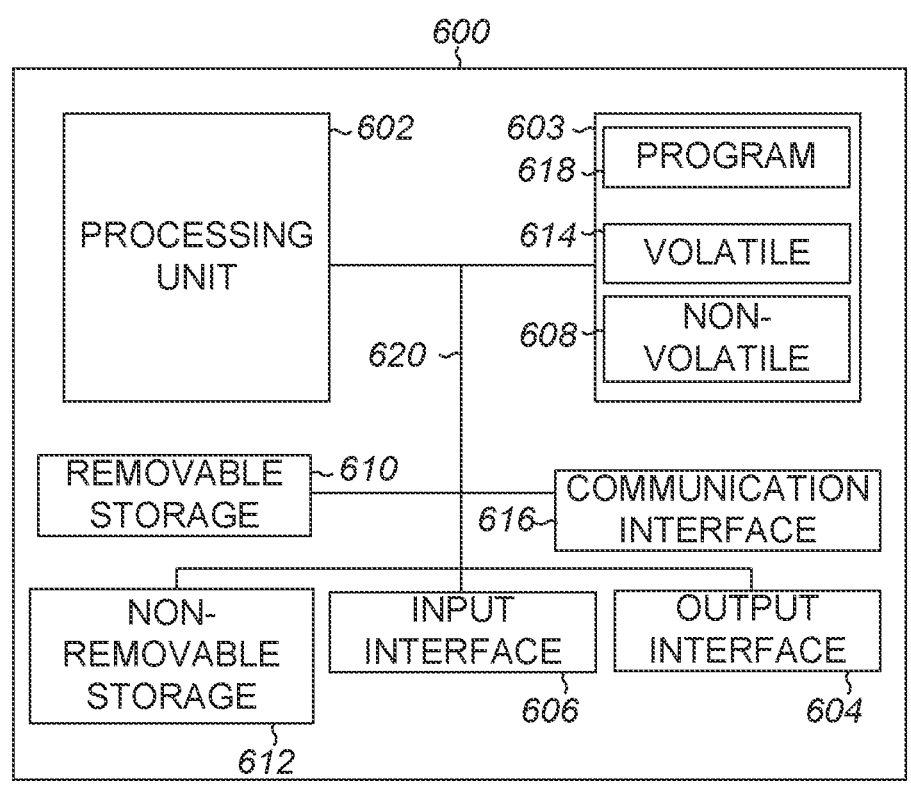
FIG. 6 illustrates, by way of example, a block diagram of an embodiment of a machine (e.g., a computer system) to implement one or more embodiments.

As shown in FIG. 1, device 110 can also include various applications, programs, modules, etc., such as application 118A and application 118B. The referenced applications can be stored in memory of device 110 (e.g., memory 603 as depicted in FIG. 6 and described below). One or more processor(s) of device 110 (e.g., processors 602 as depicted in FIG. 6 and described below) can execute such application(s). In doing so, device 110 can be configured to perform various operations, present content to user 130, etc. Examples of such applications include but are not limited to: social media/messaging applications, applications that facilitate transactions (e.g., food purchases), etc.

It should also be noted that while various components (e.g., personal assistant 116, application 118A, etc.) are depicted (e.g., in FIG. 1) as operating on device 110, this is only for the sake of clarity. However, in other implementations the referenced components (e.g., application 118A) can also be implemented on other devices/machines. For example, in lieu of executing locally at device 110, application 118A (e.g., a ride-sharing application) can be implemented remotely (e.g., on a server device or within a cloud service or framework).

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include wake word assistance engine 142 and memory 160.

The wake word assistance engine can include an application or module that configures/enables server 140 to perform various operations such as are described herein. For example, wake word assistance engine 142 can configure/enable server 140 to receive a message indicating a requested user-specified wake word (sometimes called a custom wake word), such as from the device 110, through the network 120.

As discussed previously, not all words or phrases make for good wake words. A user can end up frustrated with a poor wake word. Further, a poor wake word can unduly tax use of an application 118, 128 that deciphers the task the user 130 is requesting. This is because a poor wake word can cause more requests to be issued than intended by the user 130.

Picking a good wake word is a challenging task that requires knowledge of a problem domain that most users 130 do not possess. For example, a user may not have knowledge of the pronunciation of a word and the pronunciation may be used to determine whether their user-specified wake word is robust, such as by using a pronunciation application 144 (e.g., if the wake word is not a common word). The user-specified wake word may not be familiar with the International Phonetic Alphabet (IPA) or Universal Phone Set (UPS). Thus, the user 130 may need to specify the pronunciation. The pronunciation application 144 can aid in user in specifying the pronunciation of the user-specified wake word.

The pronunciation application 144 can receive the user-specified wake word and predict a pronunciation. The pronunciation can be predicted using a neural network (NN) or other machine learning (ML) technique, or a heuristic technique that predicts a phonetic spelling of a user-specified wake word. The phonetic spelling is a representation of vocal sounds which express pronunciations of words. The phonetic spelling is a system of spelling in which each letter represents a same spoken sound.

Note that all reference numbers in the 1XX range are referring to an item in FIG. 1, Items in FIG. 1 are referenced in explaining or describing other FIGS. of this disclosure.

Figure 2:
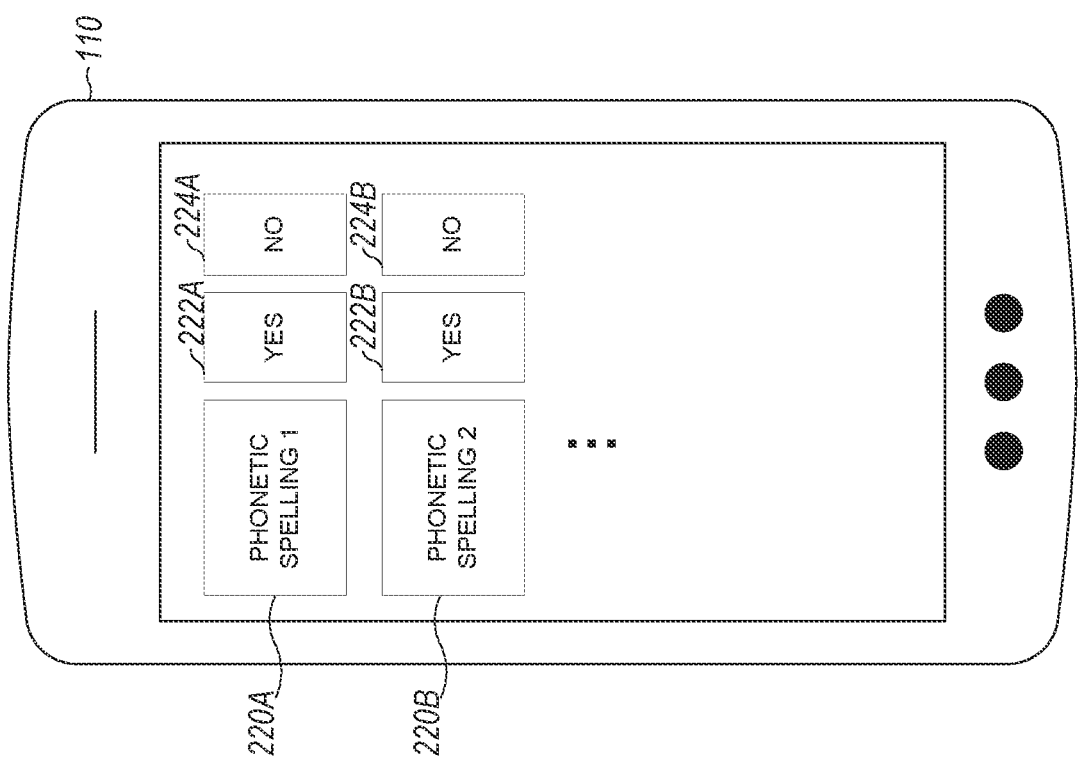
FIG. 2 illustrates, by way of example, a diagram of an embodiment of the device.

FIG. 2 illustrates, by way of example, a diagram of an embodiment of the device 110. In some embodiments, the user 130 can provide the phonetic spelling of the wake word, using the personal assistant 116. In some embodiments, a top number of phonetic spelling 220A, 220B predictions from the pronunciation application 144 can be provided to the user 130, such as by the device 110. The user 130 can indicate, by selecting a control 222, 224, whether the phonetic spelling is correct or not. Selecting a control 222, 224 can include touching the control 222, 224, clicking and releasing a mouse button while a cursor is over the control 222, 224, saying the word "yes" (or the like) or "no" (or the like) into a microphone, or the like. The selection can be provided using the personal assistant 116.

Selection of the phonetic spelling can inform the personal assistant 116 what phonemes are required and the order of the phonemes in detecting the wake word. Note that in some embodiments, multiple pronunciations of a custom wake word can be acceptable to the user 130, and the personal assistant 116 can detect both pronunciations as valid utterances of the user-specified wake word.

The phonetic spelling predicted by the pronunciation application 144 can be used to generate audio of the phonetic spelling using one or more of a variety of voice fonts. The voice font can be chosen based on a location of a user, historical voice data of the user 130, or the like. The audio can be an acoustic variation of the wake word consistent with the identified phonetic spelling, such as described regarding FIG. 2.

Figure 3:
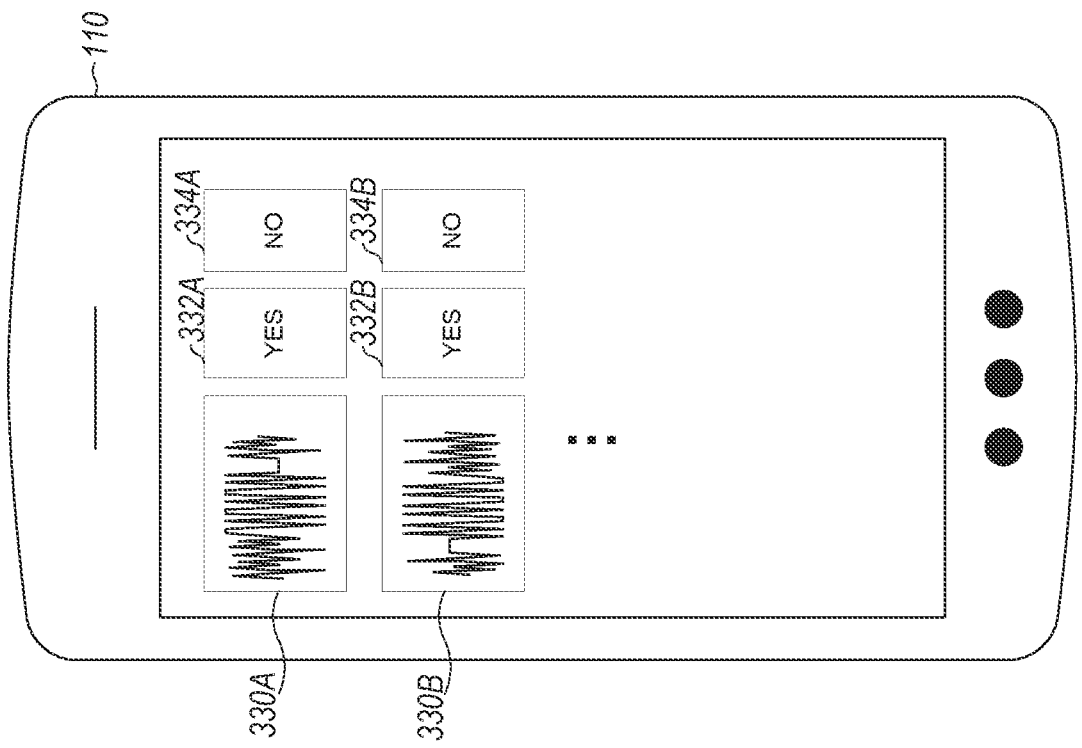
FIG. 3 illustrates, by way of example, a diagram of an embodiment of the device.

FIG. 3 illustrates, by way of example, a diagram of an embodiment of the device 110. In some embodiments, the user 130 can speak the custom wake word into a microphone 150, type the custom wake word into a text box, or a combination thereof, of the device 110. In some embodiments, a number of audio clips 330 generated using different voice fonts can be provided to the user 130. A voice font is a computer-generated voice that can be controlled by specifying parameters like speed, pitch, or the like and made to pronounce text input. Different fonts have different speeds, pitches, or another parameter. The user 130 can indicate, by selecting a control 332, 334, whether the audio clip 330 is correct or not. The selection can be provided using the personal assistant 116.

Selection of the audio clip 330 can inform the personal assistant 116 what phonemes are required and the order of the phonemes in detecting the custom wake word. Note that in some embodiments, multiple audio clips can sound correct to the user 130, and the personal assistant 116 can detect each version as valid utterances of the custom wake word.

In embodiments, the pronunciation application 144 can identify how many preferred phonemes are present in the wake word. In embodiments, the pronunciation application 144 can identify how many non-preferred phonemes are present in the wake word. A preferred phoneme can include one uttered for only a short, deterministic period of time. Examples of such phonemes include stop sounds and plosives, such as /b/, /d/, /k/, /t/, /p/. A non-preferred phoneme can include one uttered for an extended or variable duration. Example of such phonemes include /m/, /o/, /a/.

A uniqueness application 146 can assess a phonetic richness or a confusability of a wake word, such as to guide selection. Models trained on language or pronunciation data can be leveraged to identify how many unique phonemes exist in the wake word selected by the user 130. The models can be defined by model parameters in the memory 160. The uniqueness application 146 can count the number of unique phonemes in the wake word. If the number of unique phonemes is greater than a threshold (e.g., 5, 6, or more or less phonemes), the custom wake word can be associated with a higher score. The user can be provided feedback regarding the phonetic complexity of the custom wake word, such as through device 110.

One or more models can be used to determine how many other words sound phonetically similar to the user-selected wake word. This can include determining how many words, in a dictionary of words, are within a threshold distance, phonetically, of the wake word. Spell checkers are examples of applications that often determine phonetically similar words to identify what a user intended to type. A similar technique can be used to identify how many words in a dictionary of the memory 160 (if any) are phonetically similar to the wake word. The user 130 can be provided feedback regarding the phonetic uniqueness of the wake word, such as through device 110.

The uniqueness application 146 can determine how common the custom wake word is in general spoken language. Stats are available on the usage of words, such as in the memory 160 or based on the Oxford English Corpus, for an example of an English-understanding personal assistant. For example, a top N number of most commonly used words can be prohibited from use as a wake word. N can be 100, 150, 200, 225, greater, fewer, or some number therebetween. Excluding fewer most commonly used words may not exclude enough words, increasing the chances of triggering personal assistant action when the user does not want to access the personal assistant. Excluding more most commonly used words may lead to better custom wake words with fewer unintended personal assistant activations.

The uniqueness application 146 can determine how many alternative pronunciations the wake word has. For example, "live", "caramel", "syrup", and many other words have multiple pronunciations. The uniqueness application 146 can determine how many such pronunciations there are based on the audio, data regarding number of alternative pronunciations in a database (e.g., the memory 160), or the like.

An accept application 148 can determine whether the custom wake word has an acceptable False Accept (FA) rate or a True Accept (TA) rate. The accept application 148 can operate one or more ML models, specified by the model parameters, configured to detect the wake word. The accept application 148 can run the model using audio from the memory 160. The audio can include audio ranging from noise, to background chatter, to utterances of the custom wake word, among others. Segments of the audio that are known to not contain the custom wake word can be used as input to the model to test to identify how often the model mistakes an utterance that is not the custom wake word as the custom wake word. Each mistake is an FA. The FA rate can be the number of FAs per a duration of time corresponding to an amount of audio processed by the model. An acceptable FA rate can be specified by a user or pre-defined. An example of an acceptable FA rate is 0.005 FAs per hour, but other rates, greater or lesser, are possible. The user 130 can determine how important it is for them to not have an FA, such as by selecting an FA rate. Some users may be more tolerant of FAs to get their chosen custom wake word, while other users may be less tolerant of FAs and willing to identify a better custom wake word in terms of FAs. This process can take a substantial amount of time (a few minutes to tens of minutes). Thus, the process can be used on request by the user 130 or if the custom wake word passes one or more of the checks performed by the pronunciation application 144 or the uniqueness application 146.

Segments of the audio that are known to contain the custom wake word can be used as input to the model to test how often the model detects an utterance that is the custom wake word as the custom wake word. Each correct detection is a TA. The TA rate can be the number of TAs per a duration of time corresponding to an amount of audio processed by the model or a ratio of a number of detections divided by the number of utterances of the custom wake word in the audio. An acceptable TA rate can be specified by a user or pre-defined. An example of an acceptable TA rate is 0.99, 0.95, or a greater rate, lesser rate, or some rate therebetween. The user 130 can determine how important it is for them to have all utterances of the wake word as TA. Some users may be less tolerant of undetected utterances and willing to choose a more detectable custom wake word, while other users may be more tolerant of undetected utterances and willing to repeat the custom wake word as needed to access the personal assistant 116. This process can take a substantial amount of time (a few minutes to tens of minutes). Thus, the process can be used on request by the user or if the custom wake word passes one or more of the checks performed by the pronunciation application 144 or the uniqueness application 146.

In some embodiments, the audio used to determine TA rate can include utterances of the custom wake word using various voice fonts, emotions, prosody, patterns of stress or intonation, how the audio is generated, or the like, to generate a synthesized dataset that contains the custom wake word. These can then be run through the model executed by the personal assistant 116 to test how accurately the personal assistant 116 detects the custom wake word.

In embodiments, one or more scores can be generated by at least one of the pronunciation application 144, uniqueness application 146, and accept application 148. For example, the uniqueness application 146 can generate a score (e.g., a normalized value in the range [0, 1], an integer or continuous number value in a specified range, or the like) based on a number and/or type of phonemes present in the wake word and the accept application 148 can generate one or more scores based on one or more of the FA and the TA. The wake word assistance engine 142 can determine a weighted combination of the scores from the applications. The wake word assistance engine 142 can indicate that the custom wake word is acceptable in response to determining the weighted combination is greater than, or equal to, a threshold value.

FIG. 4 illustrates, by way of example, a diagram of an embodiment of the device 110. The device 110 as illustrated includes a custom wake word input box 440 and a custom wake word robustness indicator 442. The custom wake word input box 440 allows the user 130 to specify their custom wake word in text, audio, or other form. As the user speaks or types the custom wake word into the custom wake word input box 440, the custom wake word robustness indicator 442 can provide an indication of the custom wake word score generated by the custom wake word assistance engine 142. The indication can include a gray scale shading, an RGB color shading from red to green, a numerical indication, a brightness of an object, or the like. This provides feedback to the user whether their selected wake word may be too confusable with other common terms and should be avoided as the user enters or utters the custom wake word.

The system 100 allows the user 130 to select a robust wake word without needing expert knowledge of what makes a robust wake word. The user 130 is not required to perform any data collection of their own in order to determine if a custom wake word is good or not. The system 100 provides a staged approach through which feedback on custom wake words can be provided to the user 130, such as in an interactive manner. Upon passing initial robustness checks, a more rigorous background test can be scheduled on the performance of the custom wake word (e.g., to determine FA, TA, or the like). Using the system 100, the user 130 does not need to be an expert in linguistics or speech in order to select, specify, and validate the right custom wake word for their scenario.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 5:
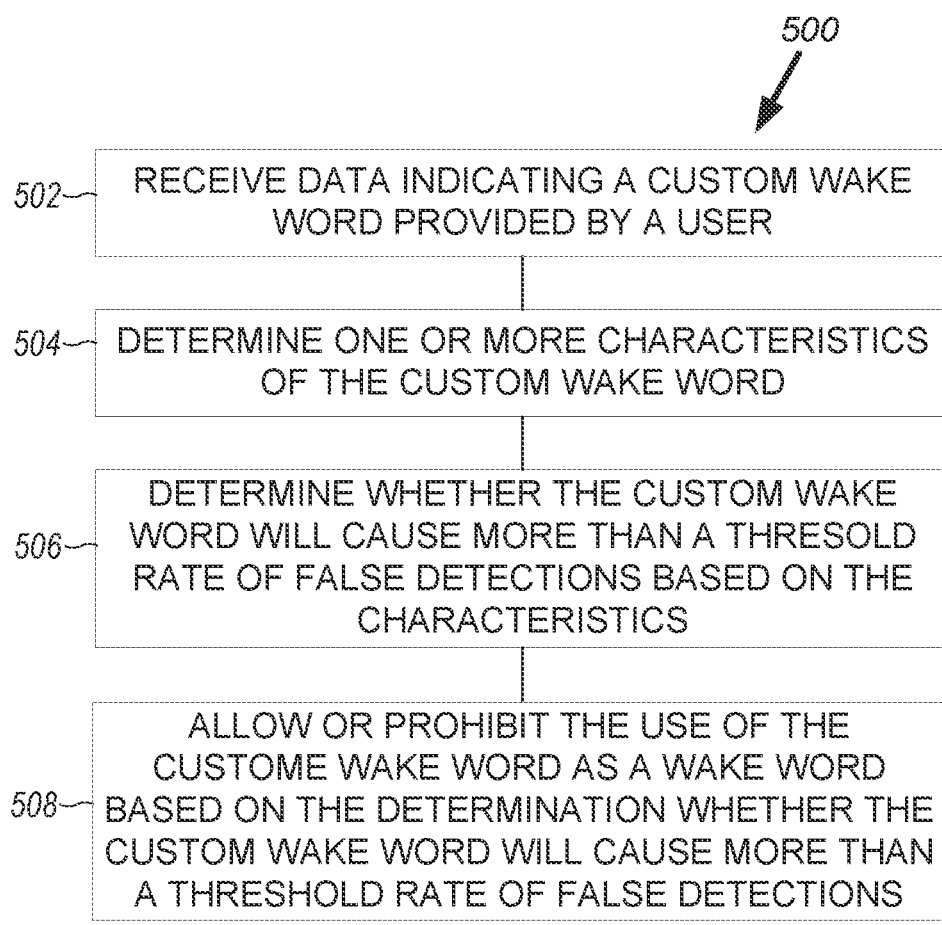
FIG. 5 illustrates, by way of example, a diagram of an embodiment of a method for wake word selection assistance.

FIG. 5 illustrates, by way of example, a diagram of an embodiment of a method 500 for custom wake word selection assistance. The method 500 as illustrated includes receiving, at a device, data indicating a custom wake word provided by a user, at operation 502; determining one or more characteristics of the provided custom wake word, at operation 504; determining whether the provided custom wake word will cause more than a threshold rate of false detections based on the characteristics, at operation 506; and allowing or prohibiting the use of the custom wake word as a wake word based on the determination whether the provided word will cause more than threshold rate of false detections. The method 500 can include prohibiting the user from using the custom wake word as the wake word in response to determining the custom wake word will cause more than a threshold rate of false detections. The method 500 can include allowing the user to use the custom wake word as the wake word in response to determining the custom wake word will not cause more than the threshold rate of false detections. The custom wake word can be provided directly to a user device by the user or a service or app separate from the device and then downloaded to the device.

The method 500 can further include, wherein determining one or more characteristics of the custom wake word include determining a number of phonemes in the custom wake word and the method further includes prohibiting the user from using the custom wake word as the wake word in response to determining the number of phonemes is less than a threshold number of phonemes. The method 500 can further include, wherein determining one or more characteristics of the custom wake word include determining a number of words within a specified semantic distance of the custom wake word and the method further includes prohibiting the user from using the custom wake word as the wake word in response to determining the number of words is greater than a specified number of words.

The method 500 can further include, wherein determining one or more characteristics of the custom wake word include determining whether the custom wake word is a proper subset of another word and the method further includes prohibiting the user from using the custom wake word as the wake word in response to determining the custom wake word is a proper subset of another word. The method 500 can further include providing a series of possible pronunciations of the custom wake word. The method 500 can further include receiving data indicating which of the possible pronunciations were selected by a user. The method 500 can further include determining the one or more characteristics based on the selected pronunciations.

The method 500 can further include, wherein the possible pronunciations are provided in text form or audio form. The method 500 can further include, wherein determining the one or more characteristics of the custom wake word include determining, using a speech recognition model, a false acceptance rate based on audio that does not include the custom wake word.

The method 500 can further include, wherein determining the one or more characteristics of the custom wake word include determining, using a speech recognition model, a correct acceptance rate based on audio that includes the custom wake word. The method 500 can further include, wherein the audio is synthetically generated with utterances of the custom wake word using various voice fonts, emotions, and prosody.

The method 500 can further include, wherein determining the one or more characteristics of the custom wake word include determining a number of stop sounds and plosives in the custom wake word and prohibiting the user from using the custom wake word as the wake word in response to determining the number of stop sounds and plosives is less than a threshold number. The method 500 can further include, wherein determining the one or more characteristics of the custom wake word include determining a number of phonemes of variable duration in the word and prohibiting the user from using the custom wake word as the wake word in response to determining the number of phonemes of variable duration is greater than a threshold number.

The method 500 can further include, wherein determining the one or more characteristics of the custom wake word includes determining at least two characteristics. The method 500 can further include determining a weighted combination of the at least two characteristics. The method 500 can further include prohibiting the user from using the custom wake word as the wake word in response to determining the weight combination is less than a threshold.

FIG. 6 illustrates, by way of example, a block diagram of an embodiment of a machine 600 (e.g., a computer system) to implement one or more embodiments. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1202 (sometimes called processing circuitry) of the machine 1200. A hard drive, CD-ROM, and RAM are some examples of articles including a non-transitory computer-readable medium such as a storage device. For example, a computer program 1218 may be used to cause processing unit 1202 to perform one or more methods or algorithms described herein.

Processing circuitry includes electric or electronic components configured to perform operations of hardware, an application, or engine. The components can include a transistor, resistor, capacitor, diode, inductor, logic gate (e.g., AND, OR, XOR, negate, buffer, or the like), multiplexer, switch, oscillator, power supply, analog to digital converter, digital to analog converter, CPU, field programmable gate array (FPGA), application specific integrated circuit (ASIC), graphics processing unit, or the like.

ADDITIONAL NOTES AND EXAMPLES

Example 1 includes a method for custom wake word selection assistance, the method comprising receiving, at a device, data indicating a custom wake word provided by a user, determining one or more characteristics of the custom wake word, determining that use of the custom wake word will cause more than a threshold rate of false detections based on the characteristics, rejecting the custom wake word as a wake word for accessing a personal assistant (e.g., refraining from setting the wake word to the custom wake word, indicating to the user that the custom wake word is not acceptable, prompting the user for another custom wake word, a combination thereof, or the like) in response to determining that use of the custom wake word will cause more than a threshold rate of false detections, and setting the custom wake word as the wake word in response to determining that use of the custom wake word will not cause more than the threshold rate of false detections.

In Example 2, Example 1 further includes, wherein determining one or more characteristics of the custom wake word include determining a number of phonemes in the custom wake word and the method further includes rejecting the custom wake word as the wake word in response to determining the number of phonemes is less than a threshold number of phonemes.

In Example 3, at least one of Examples 1-2 further includes, wherein determining one or more characteristics of the custom wake word include determining a number of words within a specified semantic distance of the custom wake word and the method further includes rejecting the custom wake word as the wake word in response to determining the determined number of words is greater than a specified number of words.

In Example 4, at least one of Examples 1-3 further includes, wherein determining one or more characteristics of the custom wake word include determining whether the custom wake word is a proper subset of another word and the method further includes rejecting the custom wake word as the wake word in response to determining the custom wake word is a proper subset of another word.

In Example 5, at least one of Examples 1-4 further includes providing a series of possible pronunciations of the custom wake word, receiving data indicating which of the possible pronunciations were selected by a user, and determining the one or more characteristics based on the selected pronunciations.

In Example 6, Example 5 further includes, wherein the possible pronunciations are provided in text form or audio form.

In Example 7, at least one of Examples 1-6 further includes, wherein determining the one or more characteristics of the custom wake word include determining, using a speech recognition model, a false acceptance rate based on audio that does not include the custom wake word.

In Example 8, at least one of Examples 1-7 further includes, wherein determining the one or more characteristics of the custom wake word include determining, using a speech recognition model, a correct acceptance rate based on audio that includes the custom wake word.

In Example 9, at least one of Examples 5-8 further includes, wherein the audio is synthetically generated with utterances of the custom wake word using various voice fonts, emotions, and prosody.

In Example 10, at least one of Examples 1-9 further includes, wherein determining the one or more characteristics of the custom wake word include determining a number of stop sounds and plosives in the custom wake word and rejecting the custom wake word as the wake word in response to determining the number of stop sounds and plosives is less than a threshold number.

In Example 11, at least one of Examples 1-10 further includes, wherein determining the one or more characteristics of the custom wake word include determining a number of phonemes of variable duration in the custom wake word and rejecting the custom wake word as the wake word in response to determining the number of phonemes of variable duration is greater than a threshold number.

In Example 12, at least one of Examples 1-11 further includes, wherein determining the one or more characteristics of the custom wake word includes determining at least two characteristics, the method further includes determining a weighted combination of the at least two characteristics, and rejecting the custom wake word as the wake word in response to determining the weight combination is less than a threshold.

Example 13 includes a device, system, or non-transitory machine-readable medium including instructions that, when executed by a machine, cause the machine to perform the method of one of Examples 1-12.

Example 14 includes means for performing the method of one of Examples 1-12.

Example 15 includes a system comprising processing circuitry and memory including instructions that, when executed by the processing circuitry, cause the processing circuitry to perform operations for custom wake word selection, the operations comprising determining one or more characteristics of a custom wake word, determining that use of the custom wake word will cause more than a threshold rate of false detections based on the characteristics, rejecting the custom wake word as the wake word for accessing a personal assistant in response to determining that use of the custom wake word will cause more than a threshold rate of false detections, and setting the custom wake word as the wake word in response to determining that use of the custom wake word will not cause more than the threshold rate of false detections.

In Example 16, Example 15 further includes, wherein determining one or more characteristics of the custom wake word include determining a number of phonemes in the custom wake word and the method further includes rejecting the custom wake word as the wake word in response to determining the number of phonemes is less than a threshold number of phonemes.

In Example 17, at least one of Examples 15-16 further includes, wherein determining one or more characteristics of the custom wake word include determining a number of words within a specified semantic distance of the custom wake word and the method further includes rejecting the custom wake word as the wake word in response to determining the determined number of words is greater than a specified number of words.

In Example 18, at least one of Examples 15-17 further includes, wherein determining one or more characteristics of the custom wake word include determining whether the custom wake word is a proper subset of another word and the method further includes rejecting the custom wake word as the wake word in response to determining the custom wake word is a proper subset of another word.

Example 19 includes a non-transitory machine-readable medium including instructions that, when executed by a machine, cause the machine to perform operations of custom wake word selection assistance, the operations comprising determining one or more characteristics of a custom wake word, determining that use of the custom wake word will cause more than a threshold rate of false detections based on the characteristics, rejecting the custom wake word as the wake word for accessing a personal assistant in response to determining that use of the custom wake word will cause more than a threshold rate of false detections, and setting the custom wake word as the wake word in response to determining that use of the custom wake word will not cause more than the threshold rate of false detections.

In Example 20, Example 19 further includes, wherein the operations further comprise providing a series of possible pronunciations of the custom wake word, receiving data indicating which of the possible pronunciations were selected by a user, and determining the one or more characteristics based on the selected pronunciations.

In Example 21, at least one of Examples 19-20 further includes, wherein determining the one or more characteristics of the custom wake word include determining, using a speech recognition model, a false acceptance rate based on audio that does not include the custom wake word.

In Example 22, at least one of Examples 19-21 further includes, wherein determining the one or more characteristics of the custom wake word include determining, using a speech recognition model, a correct acceptance rate based on audio that includes the custom wake word, wherein the audio is synthetically generated with utterances of the custom wake word using various voice fonts, emotions, and prosody.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for custom wake word selection assistance, the method comprising:
   receiving, at a device, data indicating a custom wake word provided by a user;
   determining one or more characteristics of the custom wake word including counting a number of unique phonemes within the custom wake word; and
   updating the custom wake word as the wake word in response to determining that the number of unique phonemes is greater than a threshold number of unique phonemes.

2. The method of claim 1, wherein the method further includes refraining from updating the custom wake word as the wake word in response to determining the number of unique phonemes is less than a threshold number of unique phonemes.

3. The method of claim 1, further comprising:
   providing, to the user, a series of possible pronunciations of the custom wake word;
   receiving, by the user, data indicating which of the possible pronunciations were selected by the user; and
   determining the one or more characteristics based on the selected pronunciations.

4. The method of claim 3, wherein the possible pronunciations are provided to the user in text form or audio form.

5. The method of claim 1, further comprising receiving an acceptable false acceptance rate from the user.

6. The method of claim 5, wherein determining the one or more characteristics of the custom wake word further includes determining, using a speech recognition model, a false acceptance rate based on audio that includes no utterances of the custom wake word, and the method further comprises rejecting the custom wake word as the wake word in response to determining the false acceptance rate is greater than the acceptable false acceptance rate.

7. The method of claim 1, wherein determining the one or more characteristics of the custom wake word further includes determining, using a speech recognition model, a correct acceptance rate based on audio that includes the custom wake word, the correct acceptance rate indicating a number of correct acceptances of the custom wake word per unit time.

8. The method of claim 7, wherein the audio is synthetically generated using various voice fonts, emotions, and prosody.

9. The method of claim 8, wherein a font of the fonts is determined based on a location of the user.

10. The method of claim 1, wherein determining the one or more characteristics of the custom wake word further includes counting a number of stop sounds and plosives in the custom wake word and rejecting the custom wake word as the wake word in response to determining the number of stop sounds and plosives is less than a threshold number.

11. The method of claim 1, wherein:
   determining the one or more characteristics of the custom wake word further includes determining at least two characteristics including a number of unique phonemes in the custom wake word and a false acceptance rate of the custom wake word,
   the method further includes determining a weighted combination of the at least two characteristics, and
   rejecting the custom wake word as the wake word in response to determining the weight combination is less than a threshold.

12. A system comprising:
   processing circuitry;
   memory including instructions that, when executed by the processing circuitry, cause the processing circuitry to perform operations for custom wake word selection, the operations comprising:
   receiving, at a device, data indicating a custom wake word provided by a user;
   determining one or more characteristics of the custom wake word including counting a number of unique phonemes within the custom wake word; and
   updating the custom wake word as the wake word in response to determining that the number of unique phonemes is greater than a threshold number of unique phonemes.

13. The system of claim 12, wherein the operations further include refraining from updating the custom wake word as the wake word in response to determining the number of unique phonemes is less than a threshold number of unique phonemes.

14. The system of claim 12, wherein the operations further include:
   providing, to the user, a series of possible pronunciations of the custom wake word;
   receiving, by the user, data indicating which of the possible pronunciations were selected by the user; and
   determining the one or more characteristics based on the selected pronunciations.

15. The system of claim 14, wherein the possible pronunciations are provided to the user in text form or audio form.

16. The system of claim 12, wherein the operations further comprise receiving an acceptable false acceptance rate from the user.

17. The system of claim 16, wherein determining the one or more characteristics of the custom wake word further includes determining, using a speech recognition model, a false acceptance rate based on audio that includes no utterances of the custom wake word, and the operations further comprise rejecting the custom wake word as the wake word in response to determining the false acceptance rate is greater than the acceptable false acceptance rate.

18. A non-transitory machine-readable medium including instructions that, when executed by a machine, cause the machine to perform operations of custom wake word selection assistance, the operations comprising:
   Receiving data indicating a custom wake word provided by a user;
   determining one or more characteristics of the custom wake word including counting a number of unique phonemes within the custom wake word; and
   updating the custom wake word as the wake word in response to determining that the number of unique phonemes is greater than a threshold number of unique phonemes.

19. The non-transitory machine-readable medium of claim 18, wherein determining the one or more characteristics of the custom wake word further includes determining, using a speech recognition model, a correct acceptance rate based on audio that includes the custom wake word, the correct acceptance rate indicating a number of correct acceptances of the custom wake word per unit time.

20. The non-transitory machine-readable medium of claim 19, wherein:
   the audio is synthetically generated using various voice fonts, emotions, and prosody; and
   a font of the fonts is determined based on a location of the user.

\* \* \* \* \*